United States Patent [19]

Saito et al.

[11] Patent Number: 4,794,309

[45] Date of Patent: Dec. 27, 1988

[54] ELECTRIC ACTUATOR FOR A CONTROL VALVE

[75] Inventors: Takeshi Saito, Mishima; Takeshi Suguro, Shizuoka; Toshio Endo, Numazu; Yutaka Utsumi, Hiratsuka, all of Japan

[73] Assignees: Bailey Japan Co., Ltd., Shizuoka; Nippon Gear Co., Ltd., Kanagawa, both of Japan

[21] Appl. No.: 123,151

[22] Filed: Nov. 20, 1987

[30] Foreign Application Priority Data

Aug. 26, 1987 [JP] Japan ............................... 62-210206
Nov. 5, 1987 [JP] Japan ............................... 62-280185

[51] Int. Cl.$^4$ ............................................. F16K 31/04
[52] U.S. Cl. ........................................ 318/9; 318/286; 318/466; 251/129.13
[58] Field of Search ............ 318/8, 9, 466, 468, 318/469, 286; 192/142 R; 251/129.01, 129.11, 129.12, 129.13

[56] References Cited

U.S. PATENT DOCUMENTS

| | | | |
|---|---|---|---|
| 3,700,085 | 10/1972 | Balz | 192/142 R X |
| 4,364,111 | 12/1982 | Jocz | 251/129.11 X |
| 4,445,075 | 4/1984 | Fry | 318/283 X |
| 4,452,423 | 6/1984 | Beblavi et al. | 251/129.11 X |
| 4,456,865 | 6/1984 | Robertson et al. | 318/599 |
| 4,556,832 | 12/1985 | Rollins | 251/129.12 X |

Primary Examiner—Bentsu Ro
Attorney, Agent, or Firm—Frishauf, Holtz, Goodman & Woodward

[57] ABSTRACT

An electric actuator for a control valve for fluids utilizes an induction motor to control the degree of opening of the valve and is provided with a control system which determines the deviation of the actual opening degree from the demand opening degree, generates a valve opening or closing speed command in accordance with the opening deviation, determines the deviation of the actual opening or closing speed from the command speed, generates a torque command in accordance with the speed deviation, and computes by means of the vector computing method the primary current to be supplied to the induction motor to enable the induction motor to output the required torque. When the valve is in the fully closed position, the control system stops the supply current to the induction motor and activates a braking device which locks the motor shaft to prevent reverse rotation of the motor shaft due to load reaction. The actuator has a means for re-starting the induction motor to optimize the thrust load should any change occur in the level of thrust acting on the valve rod. The actuator is furthermore provided with a means for diagnosing whether any abnormal performance is due to wear and/or deterioration of the induction motor, of the torque transmitting system or of the valve body.

5 Claims, 4 Drawing Sheets

ELECTRIC ACTUATOR FOR A CONTROL VALVE

BACKGROUND OF THE INVENTION

1. Field of the Invention

The present invention relates to an actuator for an electrically actuated control valve which is suitable for use in controlling pressure and flow rate of high-pressure fluids such as high-pressure steam in a steam power plant.

2. Description of the Prior Art

A known electrically actuated control valve comprises a casing containing a valve chamber; an inlet and an outlet; a valve seat which is located in the chamber; a movable valve rod supported in the casing and connected to a valve plug; and an actuator which utilizes a D.C. servo-motor to move the valve rod so as to drive the valve plug into and out of contact with the valve seat, thereby controlling the degree of opening of the control valve.

The D.C. servomotor in turn is under the control of a phase-control type controller, which determines the deviation of the actual opening degree from a demand opening degree and drives the D.C. servomotor in the direction required to reduce the deviation. The controller then stops the D.C. servomotor when the deviation has been reduced to zero.

When stopped at the demand opening degree, however, the D.C. servomotor cannot produce torque to balance the load acting on the valve rod. A worm gear train which provides an automatic locking function is therefore incorporated in the system for transmitting torque from the D.C. servomotor to the valve rod. The provision of the worm gear train, however, complicates the construction of the torque-transmitting system and requires the D.C. servomotor to have a large capacity because of the low torque-transmitting efficiency of the worm gear train.

A valve actuator utilizing a D.C. servomotor must also incorporate a torque limit switch in the torque-transmitting system in order to protect the valve members and the torque transmitting system itself from any excessive force which may be caused by any foreign material jammed between the valve plug and the valve seat when the valve is in the fully closed position or in an intermediate open state.

Furthermore, the operating speed is limited and additional maintenance work is necessitated because of the brushes required by the DC motor to rectify the electric current.

SUMMARY OF THE INVENTION

The objective of the present invention is to provide an electric actuator which can accurately actuate a control valve without making use of a D.C. servomotor, a worm gear train to automatically lock the valve, or a torque limiter in the torque transmitting system.

To this end, according to one aspect of the present invention, provision is made for an electric actuator for a control valve of the type which comprises a casing containing a valve chamber, an inlet and an outlet, a valve seat which is located in the chamber, and a movable rod supported in the casing and connected to a valve plug; said actuator utilizing; (I) an A.C. induction motor to move the valve rod so as to drive the valve plug into and out of contact with the valve seat, thereby controlling the degree of opening of the control valve, and (II) a control system which determines the deviation of the actual opening degree from the demand opening degree, generates a valve opening or closing speed command according to the deviation, determines the difference between the actual opening or closing speed and the command speed, generates a torque command according to the speed difference, and by means of the vector computing method computes the primary current to be supplied to the induction motor so that it outputs the appropriate torque.

According to another aspect ot the present invention, provision is made for an electric actuator for a control valve of the type which comprises a casing containing a valve chamber, an inlet and an outlet, a valve seat which is located in the chamber and a movable rod supported in the casing and connected to a valve plug; said actuator utilizing: (I) an A.C. induction motor to move the valve rod so as to drive the valve plug into and out of contact with the valve seat, thereby controlling the degree of opening of the control valve; (II) a control system which determines the deviation of the actual opening degree from the demand opening degree, generares a valve opening or closing speed command according to the deviaiton, determines the difference between the actual opening or closing speed and the command speed, generates a torque command according to the speed difference, and by means of the vector computing method computes the primary current to be supplied to the induction motor so that it outputs the appropriate torque; (III) a magnetic braking device which acts on the motor shaft to prevent reverse rotation of the shaft due to load reaction when the current supply to the induction motor is stopped by the control system at the fully closed position of the valve; (IV) a thrust detector which detects the thrust level acting on the valve rod; and (V) a thrust comparator which outputs signals to re-start the induction motor and release the braking device if the thrust level deviates from a predetermined level when the valve is in a fully closed state.

The actuator according to either aspect of the invention provides smooth control of the valve regardless of valve rod speed since the vector control method ensures that the induction motor always outputs the proper torque to balance the load at any valve position.

Furthermore, the vector control method enables the demand opening degree to be maintained without the need for a specific mechanism to lock the valve. Consequently a spur gear train, which has a high torque transmitting efficiency, can be used in place of the worm gear train. As a result a smaller motor with lower capacity is used to reduce overall size and weight.

The control system continuously monitors the current supplied to the induction motor so that the torque which is output to open or close the valve does not exceed a predetermined level, thereby obviating the need for a mechanical torque limit switch in the torque transmitting system. Moreover, the operating speed can be increased owing to the use of a squirrel-cage type induction motor, which, being brushless, reduces maintenance work.

In the actuator in accordance with the second aspect of the present invention, the power supply to the induction motor is stopped and the braking device simultaneously locks the motor shaft when the valve is fully closed. Thus power is conserved and no heat is generated. The thrust comparator continuously monitors the signal from the thrust detector and acts to restart the induction motor and release the braking device in the event that a change in fluid temperature should require the seating load to be adjusted, thereby ensuring that optimum thrust control is always obtained.

The above and other objectives, features and advantages of the present invention will be made clear by the following description of the preferred embodiments when read in conjunction with the accompanying drawings.

DESCRIPTION OF THE PREFERRED EMBODIMENTS

Figure 1:
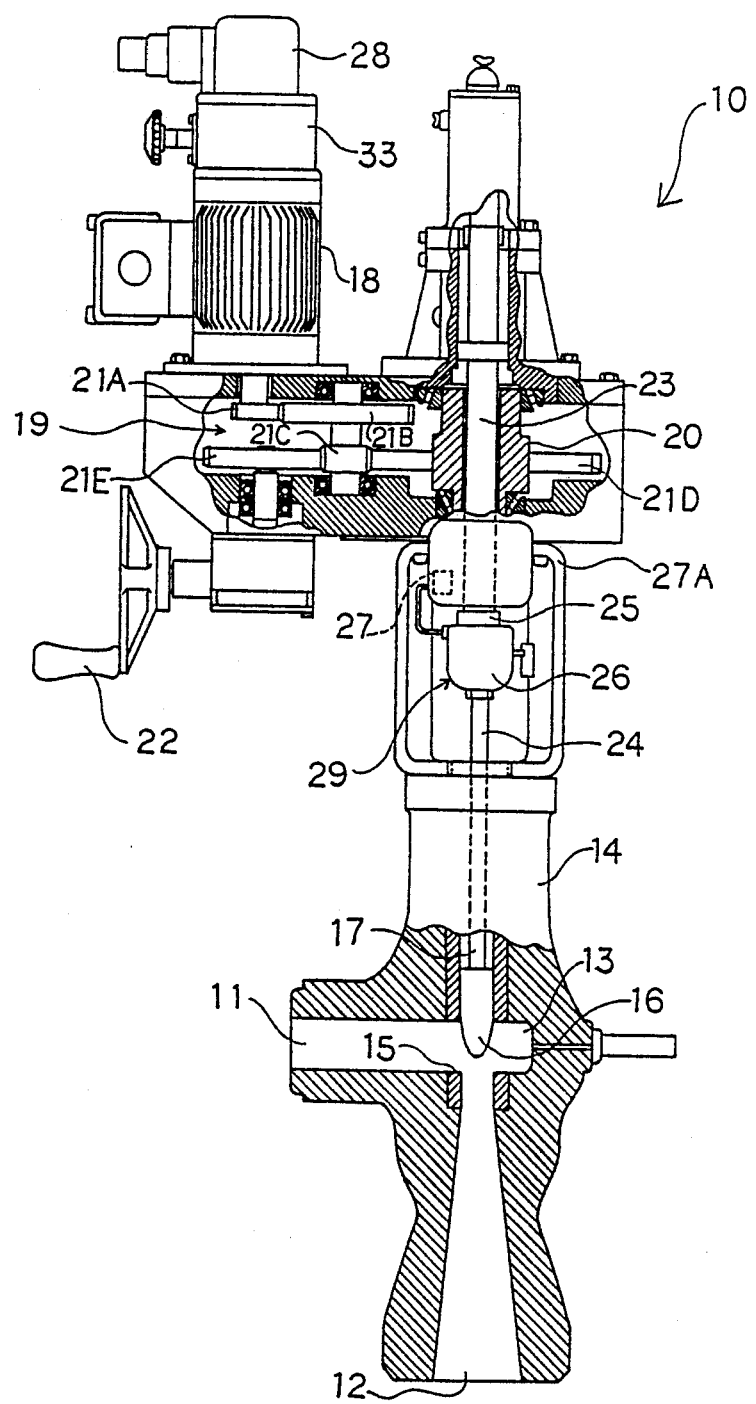
FIG. 1 is a partly-sectioned front elevational view of an actuator in accordance with the present invention and of a control valve actuated by the actuator.

As shown in FIG. 1, the control valve 10 has a casing 14 containing therein a valve chamber 13 and provided with an inlet passage 11 and an outlet passage 12, a valve seat 15 located in the casing 14, and a movable valve rod 17 which is supported in the casing 14 and which is connected to a valve plug 16.

The control valve 10 is designed to be actuated by an actuator which includes an A.C. servomotor 18 of the induction motor type. The servomotor 18 is connected to the valve rod 17 through a reduction gear device 19 and a ball screw device 20 and drives the valve rod 17 so as to move the valve plug 16 into and out of contact with the valve seat 15, thereby controlling the degree of opening of the control valve 10. The reduction gear device 19 comprises a spur gear train including spur gears 21A to 21D. A manual handle 22 is connected to the reduction gear device 19 through gear 21E.

The valve rod 17 comprises an upper rod section 23 connected to the ball screw device 20, a lower rod section 24 connected to the valve plug 16, and adapter 25 attached to the lower end of the upper rod section 23 and a coupling 26, which is attached to the upper end of the lower rod section 24 and which couples axially with the adapter 25.

The control valve 10 has a yoke 27A on whcih is mounted a position transmitter 27, which may be of the differential transformer type. In the illustrated embodiment, the axial displacement of the lower valve rod 24 is transmitted through a linkage to the position tranmitter 27 so that the transmitter 27 transmits a signal corresponding to the degree of opening of the control valve 10.

An encoder 28 provided on the shaft of the motor 18 detects the degree of rotation of the motor shaft.

Figure 3:
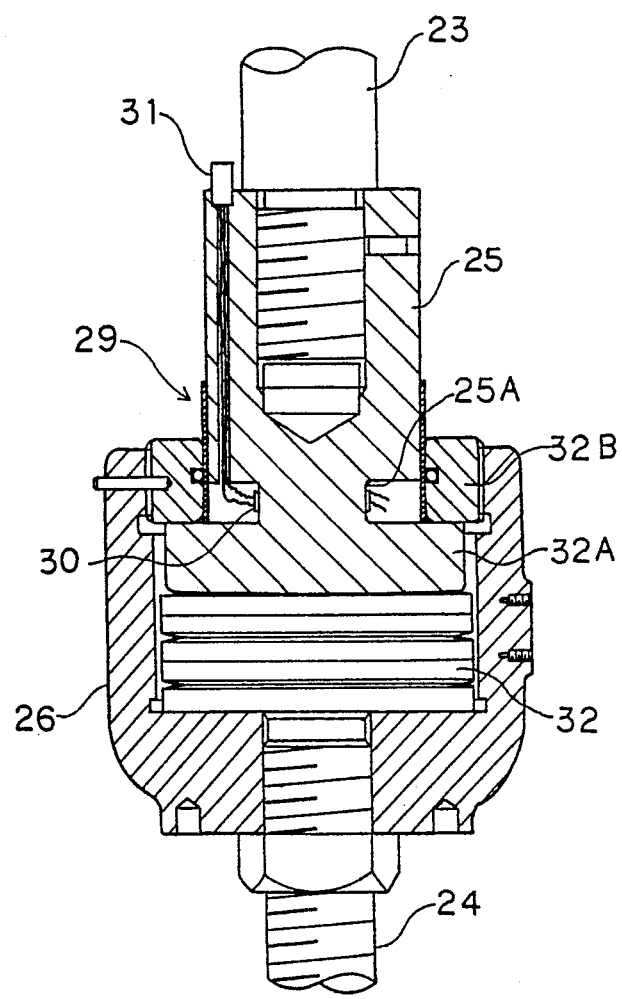
FIG. 3 is a sectional view of a part of the actuator shown in FIG. 1.
Figure 4:
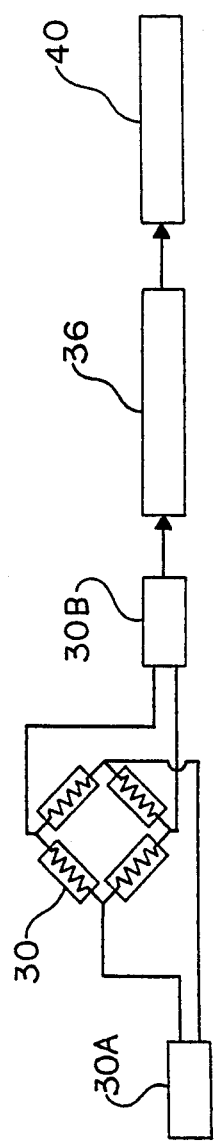
FIG. 4 is a block diagram of the thrust detection system.

The control valve 10 is equipped with a thrust detector 29, which detects the thrust force acting on the valve rod 17. As shown in FIG. 3, the thrust detector 29 has a strain gauge 30 constructed in the form of a Wheatstone bridge and attached to the smaller diameter portion 25A of the adapter 25. As will be seen from FIG. 4, the strain gauge 30 is connected to an electric power supply circuit 30A. The output of the strain gauge 30 is transferred to the thrust comparator 36 through an amplifier 30B. As shown in FIG. 3, buffering disk springs 32 are provided between the adapter 25 and the coupling 26 in order to absorb any axial expansion which may occur in locations 32A and 32B.

The servomotor 18 is provided with an electromagnetic braking device 33 so as to prevent reverse rotation of the motor shaft due to load reaction when the current supply to the motor 18 is stopped by the control system 34.

Figure 2:
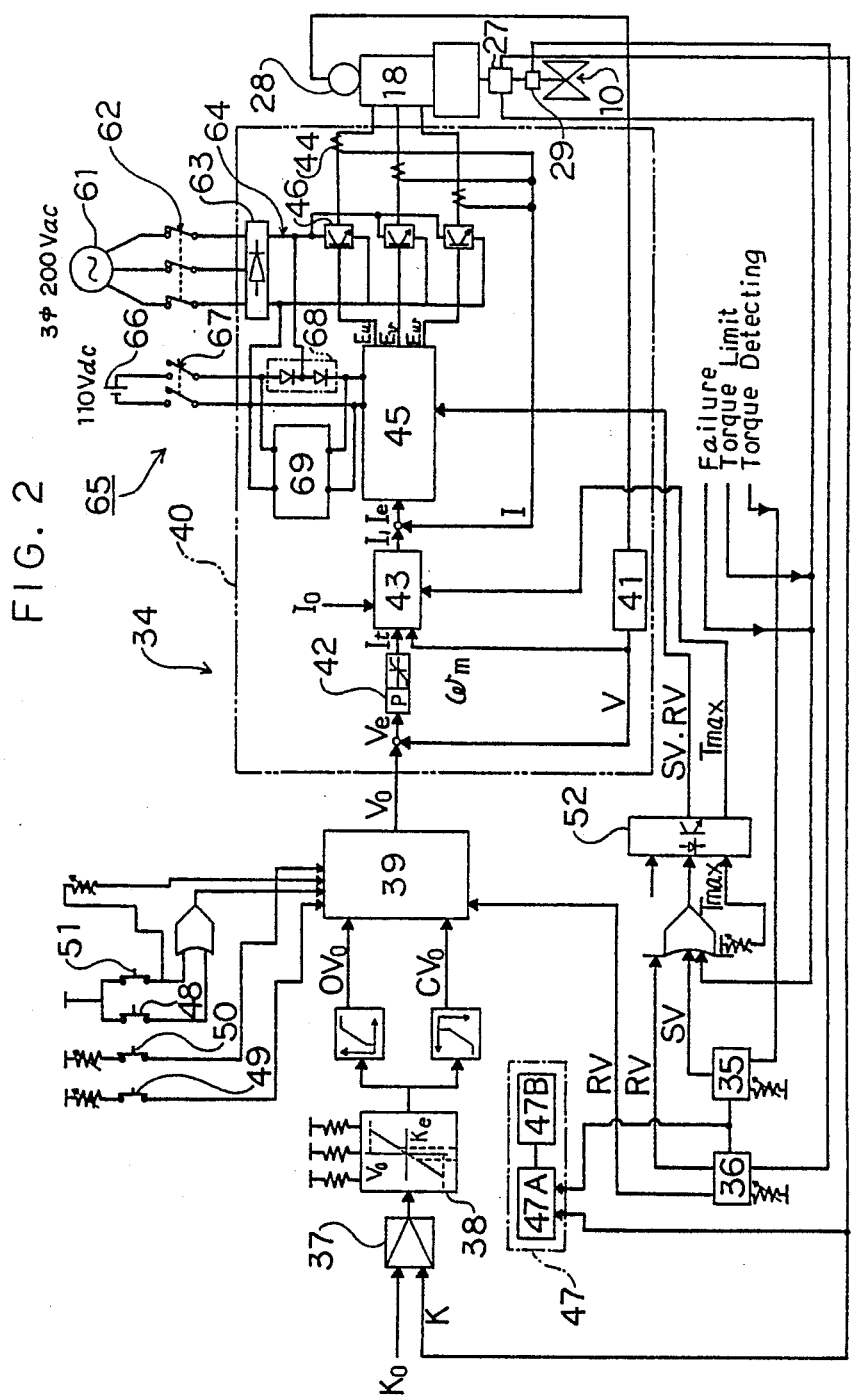
FIG. 2 is a block diagram of the control system for the actuator shown in FIG. 1.

As will be seen from FIG. 2, the control system 34 incorporates a torque comparator 35 and a thrust comparator 36.

The control system 34 includes a speed command computing circuit 38, which receives via an amplifier 37 a demand valve opening degree Ko and the present valve opening degree K transmitted from the position tranmitter 27. The speed command computing circuit 38 computes an opening speed command OVo or a closing speed command CVo according to the deviation De of the present opening degree K from the demand opening degree Ko. The opening speed command OVo or the closing speed command CVo are transmitted to an AC servo-amplifier 40 through an interface circuit 39.

The control system 34 also incorporates a speed computing circuit 41 which receives the output of the encoder 28, which detects the degree of rotation of the motor shaft, and which computes the actual motor speed V.

The A.C. servo-amplifier 40 computes the speed deviation Ve of the actual motor speed V from the opening or closing speed command OVo or CVo. The speed deviation Ve is input to a torque command computing circuit 42, which computes a torque command It in accordance with the speed deviation Ve. The torque command It takes the form of an electric signal and is output to a vector computing circuit 43, which computes, in accordance with the vector-computing method, the level of the primary current Io to be supplied to the motor 18. More specifically the vector computing circuit 43 computes the command currents Iu, Iv and Iw which are to be supplied to the U, V and W phases of the servomotro 18. The AC servo-amplifier 40 determines the current deviation Ie, that is the difference between the actual primary current I detected by a current detector 44 and the command primary current I₁ mentioned above. The current deviation Ie is supplied to a power supply control circuit 45, which computes voltage commands Eu, Ev and Ew in accordance with the current deviation Ie. The voltage commands Eu, Ev and Ew are then supplied to power transistors 46, which are connected to the respective phases of the servomotor 18, thereby controlling the servomotor 18.

The vector computing circuit 43 receives the torque command it computed by the torque command computing circuit 42, the angular speed ωm of the motor shaft computed by the speed computing circuit 41 and a predetermined excitation current command Io memorized by the A.C. servoamplifier 40, and computes the level of primary current I₁, the phase angle ϕ, the slipping frequency ωw and the output frequency ωo by means of equations 1~4 below:

Level of primary current: $I_1 = \sqrt{I_o^2 + I_t^2}$ (1)

Phase angle: $\phi = \tan^{-1}(I_t/I_o)$ (2)

Slipping frequency: $\omega_s = (1/\tau)(I_t/I_o)$ (3)

-continued

Output frequency: $\omega o = \omega s + \omega m$     (4)

$\tau$ is a coefficient which is predetermined individually for each motor unit. The vector computing circuit 43 then utilizes the results of equations 1~4 above to compute the primary current commands Iu, Iv and Iw for the respective phases of the servomotor 18 by means of equations 5-1, 5-2 and 5-3 below:

$$Iu = I_1 \sin(\omega o\, t + \phi) \quad \ldots(5\text{-}1)$$

$$Iv = I_1 \sin(\omega o\, t + \phi - 2\pi/3) \quad \ldots(5\text{-}2)$$

$$Iw = I_1 \sin(\omega o\, t + \phi + 4\pi/3) \quad \ldots(5\text{-}3)$$

As a safety factor to protect the actuator, the vector computing a circuit 43 also continously receives via an interface 52 a signal corresponding to a predetermined current value for the maximum allowable torque Tmax so that the torque output by the servomotor 18 never exceeds the maximum allowable torque Tmax.

The torque comparator 35 stores various normal torque data such as valve shut-off torque and valve opertion torque etc. and compares the actual output torque of the servomotor 18 with these stored data in order to detect any excessive torque which may be generated. In the event that excessive torque is generated, the torque comparator 35 outputs a stop signal SV to the power supply control circuit 45 in order to stop the servomotor 18.

The thrust detector 29 continuously monitors the thrust force acting on the valve rod 17. Since the power supply to the servomotor 18 is stopped when the valve is in the fully closed position, the thrust comparator 36 monitors the signal from the thrust detector 29 and outputs a signal RV to an interface 39 and the power supply control circuit 45 in order to re-start the servomotor 18 and optimize the thrust level acting on the valve rod 17 in the event that any change in the level of thrust should occur because of, for example, a change in the temperature of the fluid. The thrust comparator 36 also outputs a signal to release the braking device 33 when the servomotor 18 is re-started.

Furthermore, since the thrust comparator 36 provides constant monitoring of the thrust acting on the valve rod 17, the thrust comparator 36 serves to duplicate the function of the torque comparator 35 and acts as a secondary means of stopping the power supply to the servomotor in the event of a failure of the torque comparator 35.

The actuator according to the present invention is also provided with a thrust calibration/diagnostic device 47 which stores the predetermined values for the torque comparator 35 and thrust comparator 36, calibrates the amplifier 30B incorporated in the thrust detector 29, and indicates the thrust level acting on the valve rod 17. The thrust calibration/diagnostic device 47 also compares the output torque of the servomotor 18 with the actual thrust acting on the valve rod 17 as detected by the thrust detector 29 in order to calculate the efficiency rating. The thrust calibration/diagnostic device 47 may thus be used to diagnose whether any drop in efficiency which may occur over a period of time is due to wear and/or deterioration of the servomotor (18), the various mechanical parts in the power transmitting system or the valve body.

Specifically, the calibraton/diagnostic device 47 comprises a computing circuit 47A and a display circuit 47B. A signal representing the present valve opening degree detected by the position transmitter 27 and a signal representing the thrust detected by the thrust detector 29 are supplied to the computing circuit 47A. The computing circuit 47A then (1) stores as reference data the relationships between the valve opening degree and thrust in an early stage of operation of the control valve 10 (e.g., at the time of a trial run), (2) computes as actual data the relationships between the valve opening degree and thrust in actual operation of the control valve 10, and (3) compares the actual data with the reference data. Subsequently, the computing circuit 47A diagnoses the occurrence of abnormalities in the control valve on condition that the thrust at each opening degree in the actual data falls outside a permissible range of thrust at each corresponding opening degree in the reference data. As for the permissible range of actual thrust with respect to the reference thrust at each opening degree, the one stored in a memory section of the computing circuit 47A is used. In addition, the display circuit 47B displays the thrust detected by the thrust detector 29 as well as the diagnostic result computed by the computing circuit 47A.

The actuator is provided with an automatic/manual mode switch 48. When this switch is turned to the manual mode, the control valve 10 can be manually operated by means of a valve-opening button 49 or a valve-closing button 50. Manual operating speed can be adjusted within a specified range.

The actuator is also provided with an emergency operation button 51, which, when pressed, engages a circuit to either open or close the valve according to a pre-set condition regardless of the state of the automatic/manual mode switch 50. The emergency operating speed of the servomotor (18) may be adusted within a specified range.

In the control valve 10, an AC power supply (three-phase, 200 V) 61 is connected to the motor 18 via a switch 62, a rectifier 63, and an inverter rectifying circuit section 64 having a power transistor 46 for driving the motor 18.

In addition, the control valve 10 has a battery backup device 65 which functions at the time of a power failure of the AC power source 61.

The battery backup device 65 is capable of connecting a DC power source (110 V) to the inverter rectifying circuit section 64 by a connector (e.g., an electromagnetic relay) 67, and is, at the time of a power failure of the AC power source 61, capable of allowing the motor 18 to be driven by automatically closing the connector 67. Reference numeral 68 denotes a reverse-flow-preventing device which includes a diode.

Furthermore, when the connector 67 is closed, the battery backup device 65 connects the DC power source 66 to the power supply control circuit 45 via a DC/DC converter 69. The DC power source 66 connected to the power supply control circuit 45 is used as a control power source for controlling the base voltage of the power transistor 46 of the inverter rectifying circuit section 64 and for generating a three-phase alternating current corresponding to the current deviation Ie of the power supply control ciucuit 45.

A description will now be given of the manner in which the control valve 10 is actuated by the actuator of the present invention.

(1) When there is a deviation of the present opening degree K from the damand opening degree Ko, the speed command computing circuit 38 computes the opening or closing speed command OVo or CVo in accordance with the deviation Ke. The torque command computing circuit 42 of the A.C. servo-amplifier 40 computes the torque command It in accordance with the deviation Ve of the actual opening or closing speed V from the computed opening or closing speed command OVo or CVo. The vector computing circuit 43 of the AC servo-amplifier 40 computes the primary current $I_1$ which is to be supplied to the servomotor 18. The power supply control circuit 45 then supplies the primary current $I_1$ to the servomotor 18, which drives the valve rod 17 until the deviation Ke of the present opening degree Ko from the demand opening degree Ko is reduced to zero.

(2) When the deviation of the present opening degree K from the damand opening degree Ko is reduced to zero at an intermediate degree of opening of the control valve 10, the servomotor 18 is controlled to produce an output torque which balances the load acting on the valve rod 17, thereby maintaining the present opening degree of the control valve 10.

(3) When the demand opening degree Ko corresponds to a fully closed position of the valve, the motor operates until the deviation Ke of the present opening degree K from the demand opening degree Ko is reduced to zero, i.e. until the control valve 10 is fully closed. The torque comparator 35 compares the torque computed by the A.C. servo-amplifier 40 with a predetermined shut-off torque, and when the computed torque is equal to the predetermined shut-off torque, produces a signal to stop the servomotor 18. The electromagnetic braking device 33 is simultaneously activated to prevent reverse rotation of the motor shaft due to load reaction.

(4) When the control valve 10 is in a fully closed state, any thermal expansion or contraction of the valve rod 17 due to a change in the temperature of the fluid in the valve chamber causes a change in the level of the thrust acting on the valve rod 17. The thrust comparator 36 continuously monitors the level of the thrust detected by the thrust detector 29. If a decrease in the level of the thrust is detected, the thrust comparator 36 produces signals to re-start the servomotor 18 and to release the electromagnetic braking device 33, so that the torque applied to the valve rod 17 can be increased until the optimum thrust level is recovered. Conversely, if an increase in the thrust force is detected, the thrust comparator 36 produces a signal to re-start the servomotor 18 and to release the electromagnetic braking device 33 so that the torque applied to the valve rod 17 can be reduced until the optimum thrust level is recovered.

(5) The torque comparator 35 stores data relating to optimum levels of operating torque and compares the torque level computed by the A.C. servi-amplifier 40 with such torque level data so as to detect any abnormal torque. If any excessive torque is detected at any valve position, the torque comparator 35 produces a signal to stop the servomotor 18 and activate the electromagnetic braking device 33.

As will be understood from the foregoing description, the described embodiment of the present invention offers various advantages. By virtue of the vector control of the output torque of the A.C. servomotor 18 which actuates the valve rod 17, optimum torque control can be obtained regardless of the speed of the valve rod 17.

Therefore, the servomotor 18 produces a torque which balances the thrust acting on the valve rod 17, irrespective of valve position. Thus, the desired opening degree can be maintained without the need for any specific locking mechanism such as a worm gear train. Consequently a spur gear type reduction mechanism with high torque transmitting efficiency is used in place of the worm gear train so that a smaller motor with lower capacity can be used to reduce overall size and weight.

The control system 34 is provided with a function for monitoring the output torque of the servomotor 18 so as to prevent any excessive torque from being generated should the valve or torque transmitting system be accidentally locked, thereby protecting the valve members and the torque transmitting system, without the need for any mechanical torque limiter.

The use of a brushless squirred-cage type induction servomotor 18 enables the valve actuator to operate at a very high speed and reduces maintenance work.

When the control valve is fully closed, the motor shaft is locked by the electromagnetic braking device 33 and the electric power supply to the servomotor 18 is stopped, thereby conserving power and preventing heat generation in the servomotor 18. In order that optimum thrust is always obtained, the thrust comparator 36 continuously monitors the load acting on the valve rod 17 as detected by the thrust detector 29 and outputs signals to re-start the servomotor 18 and release the braking device 33 if a change in the load occurs because of a change in the temperature of the fluid.

As has been described, the actuator according to the present invention accurately and smoothly controls the operation of a control valve without making use of a D.C. servomotor and permits valve operating torque and speed to be independently controlled. It also dispenses with the need for an automatic locking mechanism (such as a worm gear train) and a mechanical torque limiter. Furthermore, the thrust force acting on the valve rod is always optimized regardless of any thermal expansion of the valve rod due to a change in fluid temperature.

Further, according to the above-described embodiment, since the thrust detector 29 is provided on the valve rod 17, any thrust actually acting on the valve rod 17 can be detected continuously with high accuracy at any valve opening position.

In addition, since the calibration/diagnostic device 47 diagnoses the presence of any abnormalities of the valve on the basis of the detected result of the thrust detector 29, faults such as the biting at the valve sliding portions by foreign substances contained in the liquid, as well as seizure, scoring, etc. occurring in the sliding portions of the valve can be accurately and readily diagnosed from changes in the thrust of the valve rod.

Further, according to the above-described embodiment, in the control valve 10 using the AC motor 18, when a power failure occurs in the AC power source 61, the connector 67 is immediately closed and, the DC power source 66 is connected to the motor 18 via the inverter rectifying circuit section 64 to supply driving electric power to the motor 18.

Accordingly, even at the time of a power failure, the control valve 10 can be operated stably without using a DC motor or providing a DC/AC inverter.

Although the invention has been described in its preferred form, it is to be understood that the described embodiment is only illustrative and various changes and modifications may be imparted thereto without departing from the scope of the invention whcih is limited solely by the appended claims.

What is claimed is:

1. An electric actuator means for controlling a control valve of the type including a casing having a valve chamber, an inlet passage and an outlet passage; a valve seat located in said valve chamber; a movable valve rod which is supportred in said casing; a valve plug connected to said valve rod; and an induction motor having an output shaft drivingly coupled to said valve rod for driving said valve plug into and out of contact with said valve seat, thereby changing the degree of opening of the control valve;

said electric actuator means comprising a control means which includes:
means for determining an opening deviation of an actual opening degree of the control valve from a demand opening degree of the control valve;
means for generating a valve opening or closing speed command in accordance with said opening deviation;
means for determining a speed deviation of the actual valve opening or closing speed from the speed corresponding to said speed command;
menas for generating a torque command in accordance with said speed deviation;
means for computing by means of a vector computing method a primary current which is to be supplied to said induction motor to cause said induction motor to output a required torque; and
means for supplying said computed primary current to said induction motor to drive said induction motor.

2. An electric actuator means for controlling a control valve of the type including a casing having a valve chamber, an inlet passage and an outlet passage; a valve seat located in said valve chamber; a movable valve rod which is supportred in said casing; a valve plug connected to said valve rod; and an induction motor having an output shaft drivingly coupled to said valve rod for driving said valve plug into and out of contact with said valve seat, thereby changing the degree of opening of the control valve;

said electric actuator means comprising:
control means which includes:
means for determining an opening deviation of an actual opening degree of the control valve from a demand opening degree of the control valve;
means for generating a valve opening or closing speed command in accordance with said opening deviation;
means for determining a speed deviation of the actual valve opening or closing speed from the speed corresponding to said speed command;
means for generating a torque command in accordance with said speed deviation;
means for computing by means of a vector computing method a primary current which is to be supplied to said induction motor to cause said induction motor to output a required torque; and
means for supplying said computed primary current to said induction motor to drive said induction motor;
braking means for locking said output shaft of said induction motor when said control valve is in a fully closed state so as to prevent reverse rotation of said output shaft due to load reaction;
thrust detector means for detecting the level of thrust acting on said valve rod; and
means coupled to said thrust detector means for restarting said induction motor and releasing said braking means responsive to a change in the level of thrust acting on said valve rod when said control valve is in a fully closed state.

3. An electric actuator means for controlling a control valve of the type including a casing having a valve chamber, an inlet passage and an outlet passage; a valve seat located in said valve chamber; a movable valve rod which is supportred in said casing; a valve plug connected to said valve rod; and an induction motor having an output shaft drivingly coupled to said valve rod for driving said valve plug into and out of contact with said valve seat, thereby changing the degree of opening of the control valve;

said electric actuator means comprising:
control means which includes:
means for determining an opening deviation of an actual opening degree of the control valve from a demand opening degree of the control valve;
means for generating a valve opening or closing speed command in accordance with said opening deviation;
means for determining a speed deviation of the actual valve opening or closing speed from the speed corresponding to said speed command;
means for generating a torque command in accordance with said speed deviation;
means for computing by means of a vector computing method a primary current which is to be supplied to said induction motor to cause said induction motor to output a required torque; and
means for supplying said computed primary current to said induction motor to drive said induction motor;
braking means for locking said output shaft of said induction motor when said control valve is in a fully closed state so as to prevent reverse rotation of said output shaft due to load reaction;
thrust detector means for detecting the level of thrust acting on said valve rod;
means coupled to said thrust detector means for restarting said induction motor and releasing said braking means responsive to a change in the level of thrust acting on said valve rod when said control valve is in a fully closed state;
said induction motor being coupled to said valve rod via a torque transmitting system which includes mechanical parts; and
diagnosing means coupled to said thrust detector means for diagnosing whether any abnormal performance of at least one of said actuator means and said control valve is due to at least one of wear and deterioration of at least one of said induction motor, said mechanical parts in said torque transmitting system and said control valve.

4. An electric actuator means according to claim 3, wherein said diagnosing means includes means for determining when the thrust detected by said thrust detector means at each opening degree of said valve falls outside a permissible range of thrust.

5. An electric actuator means for controlling a control valve of the type including a casing having a valve chamber, an inlet passage and an outlet passage; a valve seat located in said valve chamber; a movable valve rod which is supportred in said casing; a valve plug connected to said valve rod; and an induction motor having an output shaft drivingly coupled to said valve rod for driving said valve plug into and out of contact with said valve seat, thereby changing the degree of opening of the control valve;

said electric actuator means comprising:
control means which includes:
- means for determining an opening deviation of an actual opening degree of the control valve from a demand opening degree of the control valve;
- means for generating a valve opening or closing speed command in accordance with said opening deviation;
- means for determining a speed deviation of the actual valve opening or closing speed from the speed corresponding to said speed command;
- means for generating a torque command in accordance with said speed deviation;
- means for computing by means of a vector computing method a primary current which is to be supplied to said induction motor to cause said induction motor to output a required torque; and
- means for supplying said computed primary current to said induction motor to drive said induction motor;

braking means for locking said output shaft of said induction motor when said control valve is in a fully closed state so as to prevent reverse rotation of said output shaft due to load reaction; and battery backup means, responsive to power failure of an AC power source of said induction motor, for connecting a DC power source to an inverter rectifying circuit means for driving said induction motor by an AC output of said inverter rectifying circuit means at the time of power failure of said AC power source.

* * * * *